United States Patent [19]

Melching et al.

[11] Patent Number: 5,328,225
[45] Date of Patent: Jul. 12, 1994

[54] SYSTEM MOUNTABLE TO A TAILGATE OF A PICK-UP TRUCK TO IMPROVE THE UTILITY THEREOF

[75] Inventors: William E. Melching, Novi; David M. Glorio, Okemos; Joseph S. Sareny, Jr., Northville, all of Mich.

[73] Assignee: Nissan Research and Development, Inc., Farmington Hills, Mich.

[21] Appl. No.: 904,079

[22] Filed: Jun. 25, 1992

[51] Int. Cl.⁵ .................. B60P 9/00; B62D 33/03
[52] U.S. Cl. ....................... 296/26; 296/57.1
[58] Field of Search ............ 296/24.1, 26, 27, 37.6, 296/50, 57.1, 58; 224/42.42

[56] References Cited

U.S. PATENT DOCUMENTS

| | | | |
|---|---|---|---|
| 1,919,063 | 7/1933 | Hubbard | 296/26 |
| 2,784,027 | 3/1957 | Temp | 296/156 |
| 4,023,850 | 5/1977 | Tillery | 296/26 |
| 4,236,461 | 12/1980 | Barksdale | 108/44 |
| 4,266,821 | 5/1981 | Gillet | 296/37.6 |
| 4,375,306 | 3/1983 | Linder | 312/249.9 |
| 4,472,639 | 9/1984 | Bianchi | 296/26 |
| 4,531,773 | 7/1985 | Smith | 296/6 |
| 4,733,898 | 3/1988 | Williams | 296/24.1 |
| 4,778,213 | 10/1988 | Palmer | 296/26 |

FOREIGN PATENT DOCUMENTS 1244858 11/1988 Canada .

*Primary Examiner*—David M. Mitchell
*Assistant Examiner*—Andrew C. Pike
*Attorney, Agent, or Firm*—Lowe, Price, LeBlanc and Becker

[57] ABSTRACT

A light-weight set of four substantially flat rectangular plates sequentially connected to each other by hinges is pivotably mounted to a pick-up truck tailgate. Flat bar stock braces with orthogonal end tabs fit to tab-receiving elements attached to selected ones of the interconnected plates to secure them in predetermined angular relationships. The plates can thus be secured so that an enlarged containment space is generated to effectively extend an enclosed load space over the width and length of the tailgate. Similarly, by use of a pair of braces on each side, the central two of the four interconnected plates can be securely arranged to provide a flat workbench surface above the entire tailgate. Selected power tools may be mounted thereunder to project operating tool bits, e.g., a router bit, to machine workpieces on the workbench. The system can be readily placed in a folded storage position immediately adjacent the inside surface of the tailgate when not in use, with the braces securely retained in normally found recesses within the inside surface of the tailgate.

18 Claims, 6 Drawing Sheets

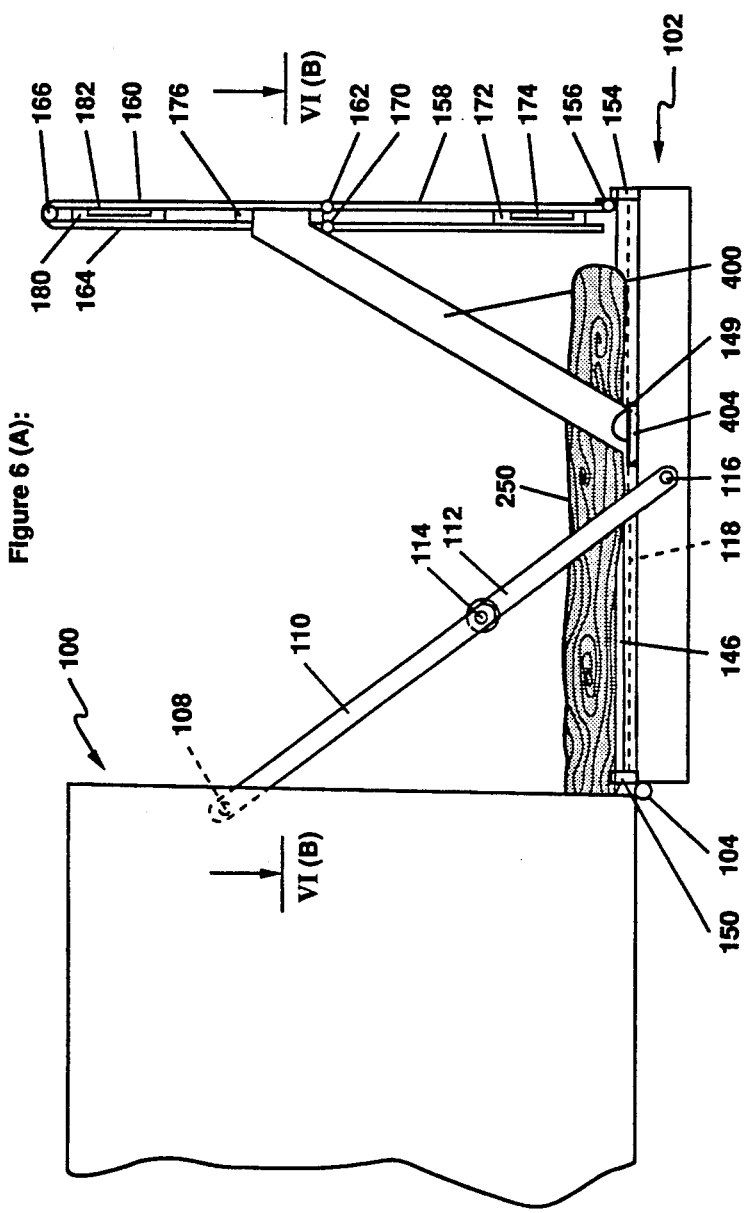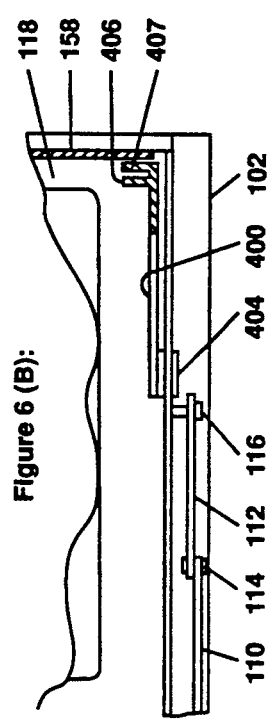

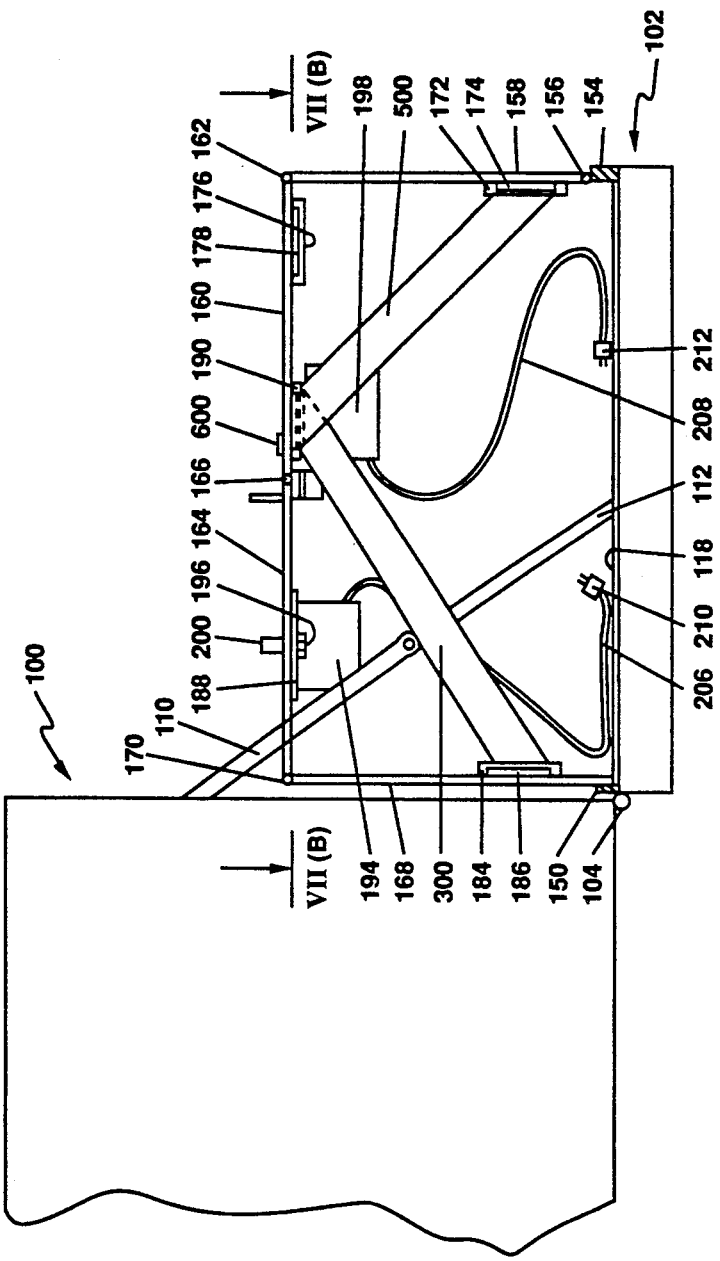
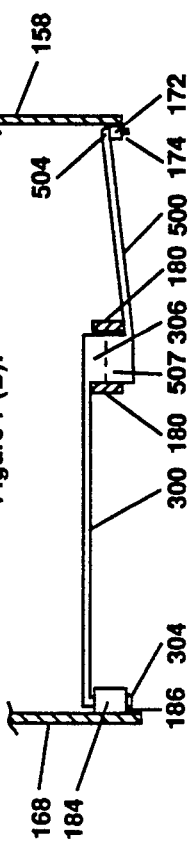
Figure 7 (A):
Figure 7 (B):

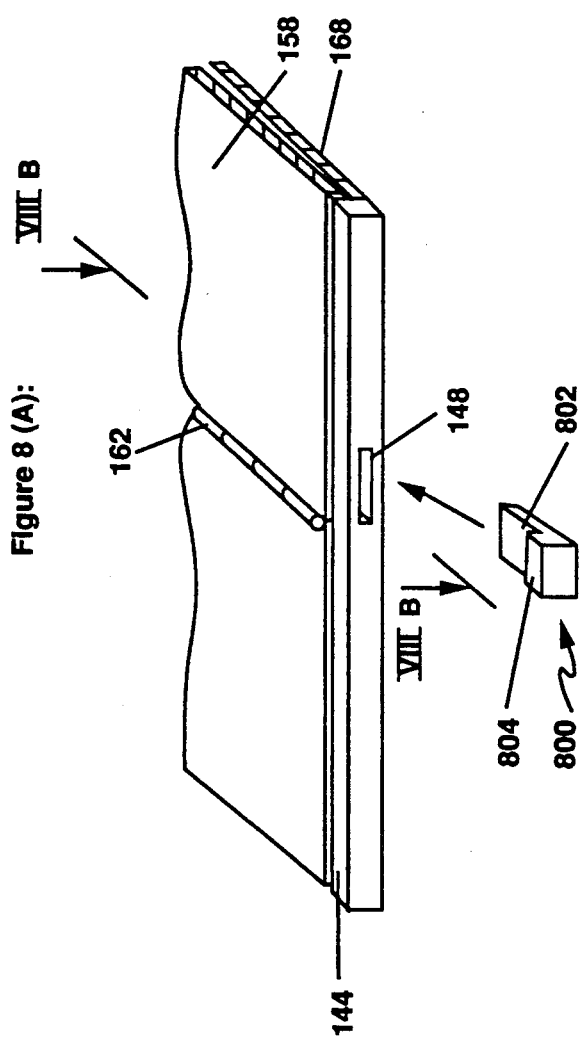
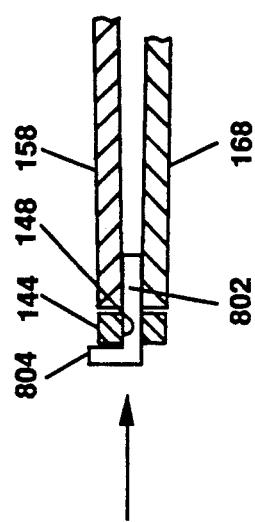
Figure 8 (A):
Figure 8 (B):

SYSTEM MOUNTABLE TO A TAILGATE OF A PICK-UP TRUCK TO IMPROVE THE UTILITY THEREOF

FIELD OF THE INVENTION

This invention relates to a structure mountable to an inside face of a conventional tailgate for a pick-up truck to improve the utility of the truck, and more particularly to a structure mounted to the tailgate so as to be compactly folded away when not needed yet quickly disposable either to extend the load-carrying space of the truck or to provide a workbench deploying readily accessible power tools over the extended tailgate.

BACKGROUND OF THE PRIOR ART

The conventional pick-up truck, having a tailgate which can be secured in an upright position to define a containment space over a load bed and which can be lowered to a substantially horizontal position, is now a very common vehicle in most countries. The utility of such a truck is generally limited by the size of its load-carrying containment space. Since it is not practical to have a pick-up truck of adjustable width, and since long objects usually cannot conveniently be carried upright, often the only effective way to enlarge the load-carrying space is to lower the tailgate to its open horizontal position. While this may enable a user of the truck to carry relatively long loads, such use may be in violation of traffic regulations and, also, it may be difficult to ensure secure retention of the long load within the extended space on the truck. There is, therefore, a clear need for an economical way to enlarge the load-carrying portion of a conventional pick-up truck while ensuring safe containment of a load carried therein.

There is yet another kind of utility which a user may find highly desirable, namely the facility for deploying one or more power tools on the truck for machining of wood or metal workpieces, e.g., for repairs, construction, or other similar applications. Preferably, any modification of the conventional pick-up truck tailgate for this purpose should enable a user, at low cost and with little effort, to be able both to enlarge the load-carrying space and to create an effective workbench equipped with one or more power tools.

An exemplary structure for simply extending the load-carrying space of a pick-up truck is disclosed in U.S. Pat. No. 4,472,639 to Bianchi, titled "TAILGATE ATTACHMENT FOR EXTENDING THE CARGO SPACE OF VEHICLES", which provides a hinged back panel with a pair of side panels pivotably attached to the sides thereof, the panels being compactly carried against the inside surface of the closed tailgate when not in use and being pivotable into a perpendicular relationship with respect to the opened tailgate. In effect, the disclosed structure creates a pseudo-tailgate and planar extensions of the sides of the pick-up truck.

Another somewhat similar solution is taught in U.S. Pat. No. 4,531,773 to Smith, titled "VEHICLE TAILGATE EXTENSION ASSEMBLY", which provides a slidingly stored assembly of flat panels normally folded away adjacent an inside surface of the tailgate and disposable to form extended sides and a back in a manner generally similar to that of Bianchi.

Permanently attached and slidably disposable structures for effectively extending the tailgate rearwardly of the truck are taught in U.S. Pat. No. 4,023,850 to Tillery, titled "TAILGATE EXTENSION", and U.S. Pat. No. 4,778,213 to Palmer, titled "EXTENDABLE VEHICLE TAILGATE ASSEMBLY".

U.S. Pat. No. 4,375,306 to Linder, titled "CABINET AND TABLE UNIT FOR A VEHICLE" and U.S. Pat. No. 2,784,027, to Temp, titled "DRAWER UNIT FOR PICK-UP TRUCKS", teach examples of known structures which include slidably extendable work surfaces and sets of drawers for containing work tools that may be provided to conventional pick-up trucks. Such structures are relatively complex, heavy and expensive.

The above-discussed exemplary prior art does not provide a user the option, with a single structure to readily increase his load-carrying space or to set up a workbench to which he may mount one or more power tools for convenient machining of workpieces at the truck tailgate itself. The present invention is intended to meet this perceived need.

SUMMARY OF THE DISCLOSURE

It is a principal object of the present invention to provide a light-weight, economical, readily-deployable structure mountable to a conventional tailgate for a pick-up truck to enable a user to quickly enlarge the load-carrying portion of the truck.

It is another object of this invention to provide a light-weight, economical, readily-deployable structure mountable to a conventional tailgate for a pick-up truck, which can be readily disposed to provide a workbench to which can be mounted one or more tools which may include power tools for machining of workpieces directly over the lowered tailgate.

It is a further related object of this invention to provide a light-weight, low cost, readily-deployable system mountable to an inside surface of a conventional pick-up truck tailgate, which a user can dispose to quickly enlarge the load capacity of the pick-up truck or to provide a workbench which can be equipped with one or more tools accessible directly over the lowered tailgate.

These and other related objects of this invention are realized by providing a system mountable to a tailgate of a pick-up truck to increase the utility thereof. The system includes a series of connected plates.

A first of these plates has first and second longitudinal edges, pivotably mounted at the first edge to pivot along a distal edge of an inside face of the tailgate. The first plate has first brace-engagement means for engaging with a first brace to be braced thereby at a predetermined first angle with respect to the inside face of the tailgate.

A second plate has third and fourth longitudinal edges, pivotably connected at the third edge to the second edge of the first plate. The second plate has second and third brace-engagement means for respectively engaging with corresponding second and third braces to be braced thereby at a predetermined second angle with respect to the inside face of the tailgate.

A third plate has fifth and sixth longitudinal edges, pivotably connected at the fifth edge to said fourth edge at the second plate;

A fourth plate has seventh and eighth longitudinal edges, pivotably connected at the seventh edge to the sixth edge of the third plate. The fourth plate has fourth brace-engagement means for engaging with a fourth brace to be braced thereby at a predetermined third angle with respect to the tailgate.

A plurality of braces which includes the first through fourth braces is provided and used for selectively engaging at least one of said first, second, third and fourth brace-engagement means to brace the connected first through fourth plates in a predetermined disposition with respect to each other and to the inside face of the tailgate.

BRIEF DESCRIPTION OF THE DRAWING

FIG. 6(A) is a side elevation view of the preferred embodiment of this invention, as mounted to a conventional tailgate of a pick-up truck and disposed in a load-space extending mode; and FIG. 6(B) is a partial plan view at Section VI(B)—VI(B) in FIG. 6(A).

FIG. 7(A) is a side elevation view of the preferred embodiment of this invention mounted to a conventional tailgate of a pick-up truck, taken at Section VII(A)—VII(A) in FIG. 2 to illustrate the system according to a preferred embodiment in a workbench mode; and FIG. 7(B) is a partial cross-sectional view taken at Section VII(B)—VII(B) in FIG. 7(A).

FIG. 8(A) is a partial perspective view of a portion of the structure according to the preferred embodiment illustrating how a key may be employed to hold elements in a folded-away disposition; and FIG. 8(B) is a partial cross-sectional view taken at Section VIIIB—VIIIB in FIG. 8(A).

DETAILED DESCRIPTION OF THE PREFERRED EMBODIMENTS

Figure 1:
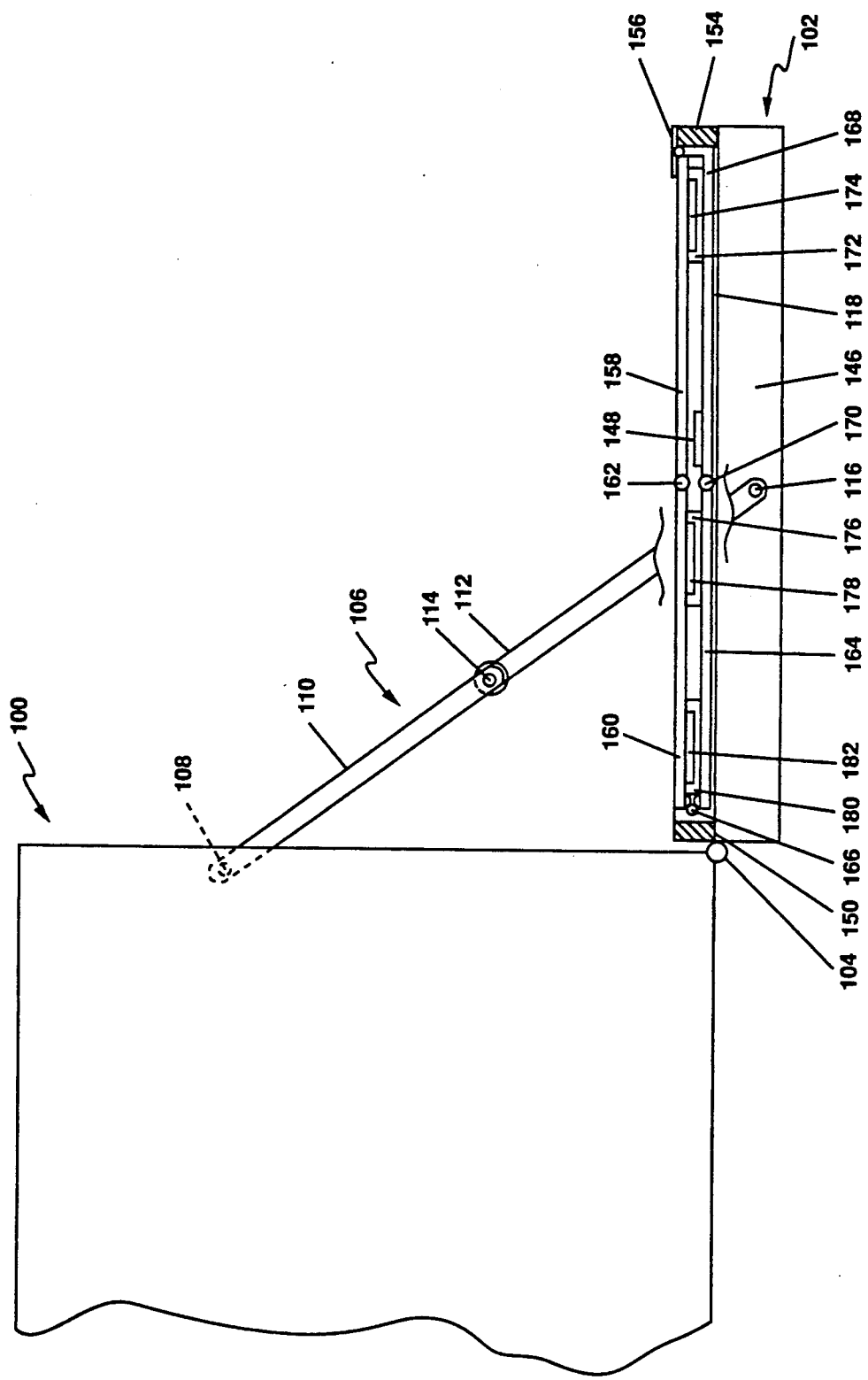
FIG. 1 is a partially sectioned side elevation view, taken at Section I—I in FIG. 2, of the rearmost portion of a conventional pick-up truck body with a lowered tailgate to which is mounted a preferred embodiment of this invention (shown in a storage mode).

As indicated in the side elevation view of the rearmost portion of a conventional pick-up truck 100, a conventional tailgate 102 is hinged to rotate about a hinge 104 to an open, substantially horizontal, position. Tailgate 102 can also be hinged upward to a substantially upright position between the ends of the side walls of the pick-up truck, to thereby define a walled-in load-space with an open top. When tailgate 102 is in its open lowered position, its weight is carried by coaction of hinge 104 and an exemplary pair of two-part stays 106 (only one visible in FIG. 1).

The typical two-part stay 106 is typically mounted at an upper distal end to a pin 108 at an inside wall of one of the truck sidewalls. The two parts, 110,112 are pivotably connected at an intermediate pivot pin 114 and the distal end of part 112 is hinged to tailgate 102 at a pin 116. Other obvious alternatives may be used with equal facility, e.g., a short length of chain, a wire cable, or the like, in place of stay 106. Whichever alternative is chosen may be formed to be permanently attached at least one end or be totally detachable at the user's discretion.

Tailgate 102 typically has a width corresponding to a spacing between the inside surfaces of the sidewalls of the pick-up truck, and a height comparable to that of the same sidewalls. Accordingly, for the structure according to the preferred embodiment of this invention per FIG. 1 to be conveniently stored when not in use must then have an overall size smaller than that of the inside face 118 of tailgate 102.

In general terms, the preferred embodiment of this invention includes a set of four light-weight planar plates, e.g., made of aluminum, successively hinged to one another, with an end plate of the set of connected plates hinged to the inside surface 118 of tailgate 102. This enables the assembly of plates to be very compactly folded away, as illustrated in FIG. 1, when it is not being deployed either to extend the load-space of the truck or to set up a workbench.

Figure 2:
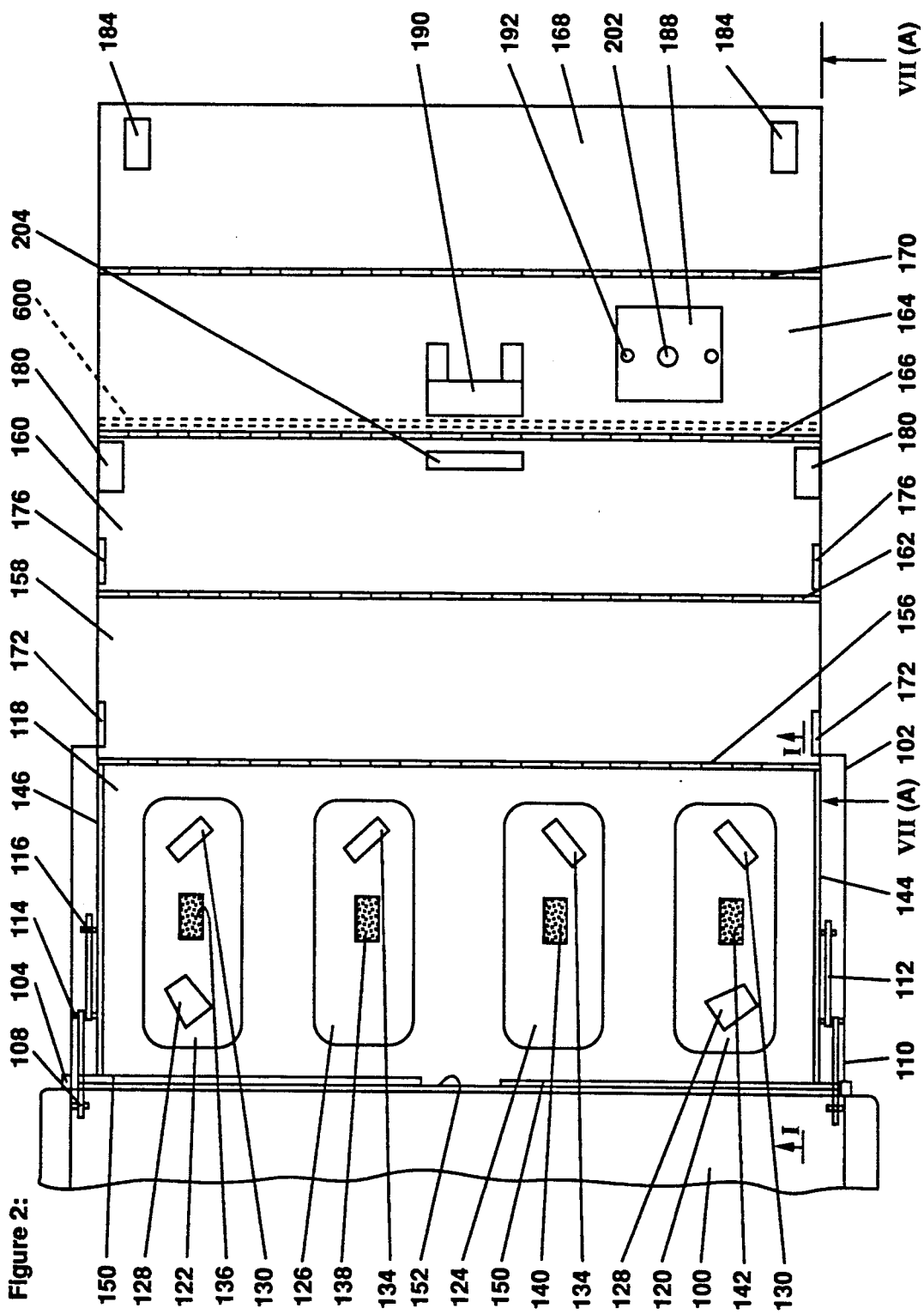
FIG. 2 is a plan view of the rearmost end of a conventional pick-up truck with a lowered tailgate to which is mounted the preferred embodiment according to FIG. 1, the system being shown in an expanded horizontal disposition to illustrate the locations of various components thereof.

Referring now to FIG. 2, the typical pick-up truck tailgate has an inside surface 118 formed with a plurality of relatively shallow depressions such as 120, 122, 124 and 126. This is done to provide greater stiffness and strength to the tailgate since entirely flat planar sheet metal can be deformed very readily. This conventional structural aspect of the typical tailgate is exploited in the present invention because it affords a plurality of relatively shallow spaces which can accommodate significant portions of various braces employed in disposing the structure in either of its working modes, i.e., either to extend the work space of the truck or to set up a workbench. To conveniently receive and locate various braces (yet to be described) within depressions 120, 122, 124 and 126, it is preferred to cut rectangular openings such as 128, 130 and 134 oriented and located generally as illustrated in FIG. 2. Between or adjacent the openings thus formed in each of depressions 120, 122, 124 and 126, in the preferred embodiment there is provided a small piece of a two-part pressure-actuated attachment means such as the kind sold by the Velcro Corporation under the trademark "VELCRO", identified by the numerals 136, 138, 140 and 142. See FIG. 2. Also, for location of an engagement with a respective brace at the outside of tailgate 102, a substantially peripheral wall is formed around the inside face ! 18 of tailgate 102 preferably by attachment of lengths of square-section aluminum stock such as 144,146,150 and 154 (best seen in FIG. 1). Lateral apertures 148,149 (best seen in FIG. 6(A)) are formed in the wall portions 144,146 respectively to closely receive therein engagement tabs of selected braces, as more full explained below. The manner in which these elongate apertures 148 and 149 are utilized will be explained in due course.

Along an edge of inside surface 118 close to hinge 104 there is provided the length 150 of the peripheral wall, and this may have a central gap 152 a few inches wide formed therein (see FIG. 2). As will be readily appreciated from a reference to FIGS. 1 and 2, once a user lowers tailgate 102 to its lowermost position, the gap 152 facilitates grabbing of the principal structure for its deployment in either of its useful modes.

At the longitudinal edge of tailgate 102 across from wall 150 in the preferred embodiment, there is provided another length 154 of the peripheral wall. This length 154 has a distal end which may be attached to a single long hinge or a series of relatively collinear hinges to support the assembled plates. FIG. 2 illustrates only a continuous hinge of this type, often referred to as "piano" hinges. One may substitute a plurality of relatively short collinear hinges instead within the scope of the present invention.

It should be appreciated that a conventional pick-up tailgate does not have walls made up of lengths of stock, e.g., 144,146,150 and 154 built in at the factory. Although minor details are omitted from the figures to avoid confusion, such walls can be readily formed of added-on elongate metal elements screwed or riveted to inside face 118 of tailgate 102. This would be the method of choice for retro-fitting of existing tailgates to employ the present invention. In the alternative, for factory-equipped tailgates intended to provide a user the benefits of this invention, such a wall can probably be more conveniently formed as an integral part of tailgate 102 when it is manufactured. The exact details of how such walls are constructed are less significant than the fact that they serve specific purposes.

Along the distal edge of wall portion 154, as best seen in FIGS. 1 and 2, there is provided an elongate hinge 156 to pivotally mount a first essentially rectangular planar plate 158. A second generally similar plate 160 is pivotably hinged to an opposite longitudinal edge of plate 158 at a second hinge 162 for pivotable connection between plates 158 and 160. In the same manner, a third plate 164 is hinged to plate 160 at hinge 166. Finally, a fourth plate 168 is hinged to plate 164 at hinge 170.

Consideration must be given to factors such as cost, weight (which translates to operational expense since it determines the total weight of the truck during its use), strength (favoring a strong metal such as steel over a lighter but weaker metal such as aluminum), durability (which favors metals over plastics or wood), and appearance. The manufacturer of this invention can choose among many options. Hinges such as 156, 162, 166 and 170 may, for example, be made of brass to avoid rusting. The hinges may be attached to the plates joined thereby in any conventional manner, e.g., by rivets, brazing or welding (depending on the metal of which the plates are formed), or even by attachment with a strong adhesive (such as an acrylocyanate if the plates are made of plastics or wood). Persons of ordinary skill in the art can fairly be expected to make such engineering choices to meet specific needs.

Since it is intended that the hinged plates should be readily foldable out of the way in a stored mode, it is preferred that any braces used to hold them in selected disposition be detachable and readily storable. Different types of braces, preferably made of thin rectangular cross-section metal stock, are provided in the preferred embodiment for selective use in bracing the various hinged-together flat plates as desired.

Figure 3:
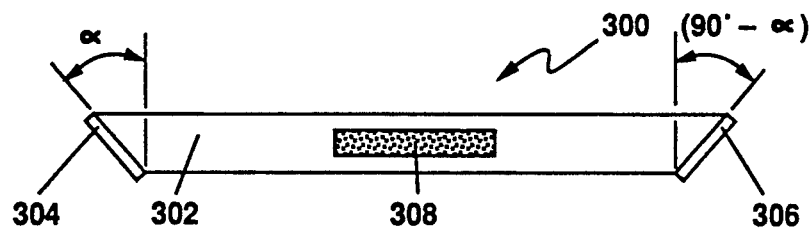
FIGS. 3(A) and 3(B) are respective plan and side elevation views of a first brace according to the preferred embodiment.
Figure 3:
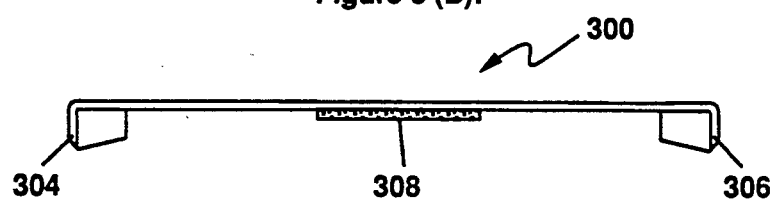

Referring now to FIGS. 3(A) and 3(B), there is shown in plan view and side elevation view respectively a first brace 300 which has a central elongate portion 302 and two symmetrically formed orthogonally bent end tabs 304 and 306. Between tabs 304 and 306 there is conveniently applied to elongate portion 302 an element of the typical two-part VELCRO (TM) element 308 for pressed engagement with its counterpart coacting portion such as 136 (see FIG. 1).

A brace such as 300 can simply be placed in a recess such as 120 so that tabs 304 and 306 respectively pass into openings such as 128 and 130. The brace 300 is thereafter retained within a depression such as 120 by pressure-actuated engagement between two parts such as 136 and 308 of a two-part fastening element, e.g., the typical VELCRO (TM) fastener. The individual parts 136 and 308 in such an arrangement may conveniently be adhered to the respective tailgate and brace surfaces with any strong adhesive, e.g., epoxy cement. Other obvious alternatives for thus detachably but securely storing the various elongate braces within corresponding selected depressions in tailgate 102 can be readily visualized.

Figure 4:
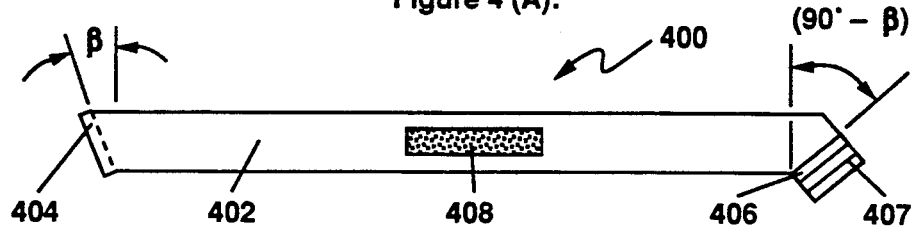
FIGS. 4(A) and 4(B) are respective plan and side elevation views of a second brace according to the preferred embodiment.
Figure 4:
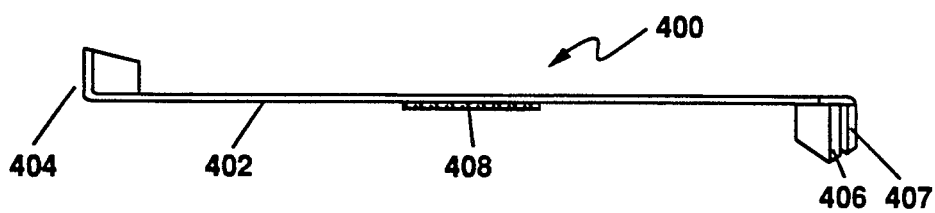

FIGS. 4(A) and 4(B) illustrate, in plan and side elevation views respectively, another brace 400 which differs from brace 300 in that it has a longer central elongate portion 402, a single tab 404 bent to be normal to elongate section 402 at one end and a pair of parallel tabs 406,407 directed the other way and also normal to elongate section 402. As with tab 300, tab 400 is provided a pressure-actuated detachable attachment element 408. As is readily seen in FIG. 4(A), tabs 406 and 407 are actually provided on an angled extended portion of elongate element 402.

Figure 5:
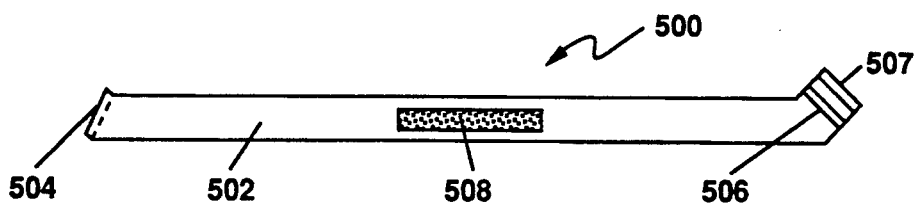
FIGS. 5(A) and 5(B) are respective plan and side elevation views of a third brace according to the preferred embodiment.
Figure 5:
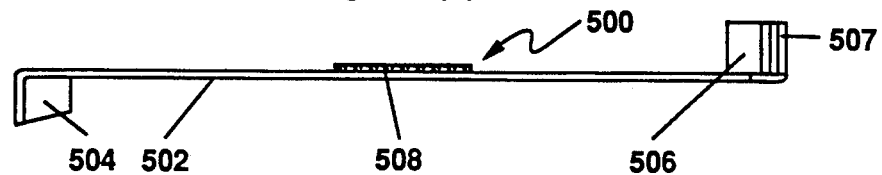

Referring now to FIGS. 5(A) and 5(B), there are seen plan and side elevation views of a third brace 500 which incorporates features common to the previously described brace 400 but is formed as a mirror image thereof. It has an elongate section 502 with a bent extension at one side and two end tabs 504 and 506 each normal to the central section 502 as illustrated.

Referring again to the corresponding figures, it will be noted that end tabs 304 and 306 of brace 300 are respectively inclined at angles "$\alpha$" and "$90° - \alpha$" with respect to the longitudinal direction of central portion 302. Tab 404 makes an angle "$\beta$" while parallel tabs 406 and 407 each make an angle "$90° - \beta$" with respect to the elongate direction of central portion 402. Tabs 504 and 506 respectively make the same angles with respect to the elongate portion of central portion 502 of brace 500 as do tabs 404 and 406 with respect to elongate portion 402 of brace 400.

As will be appreciated from a reference to FIGS. 6(A) and 7(A), values for $\alpha$ and $\beta$ are preferably in the range 30° to 45°. These are only preferred values, and other values which do not significantly interfere with the functioning of the braces may be used instead. The key is that the tabs at opposite ends are mutually orthogonal for each of the braces,, i.e., end tabs 304 and 306 of brace 300 are normal to each other, as are end tabs 404 at one end and 406 and 407 at the other end of brace 400, and end tabs 504 and 506 at the other end of brace 500.

The exact lengths of the braces and tabs, their width and thickness, etc., are mere design parameters to be selected by a user within the general ambit of the present invention.

As best seen in FIGS. 1 and 2, plates 158, 160 and 168 are each provided with symmetrically disposed tab-receiving elements, each of a U-shaped cross-section which define elongate, flat-sided, openings which are shaped and sized to receive selected tabs of the braces in close but not overly tight fit, as illustrated in FIGS. 6(A), 6(B), 7(A) and 7(B), to firmly align the braced plates as desired.

Specifically, plate 158 is provided with two relatively slim tab receiving elements 172,172 immediately adjacent the short side edges of the plate. Attachment of elements 172,172 to plate 158 can be obtained by any known means, e.g., screws, bolts, adhesive, or the like. Each element 172 upon thus being attached to a side edge portion of plate 158 defines therewith an opening 174 which, as best seen in FIGS. 7(A) and 7(B) will receive one of tabs 504 of brace 500 depending on which side of the plate is being braced.

Similarly, plate 160 is provided with tab receiving elements 176,176 attached in a manner comparable to that for tab receiving elements 172,172 on plate 158, in order to define corresponding tab-receiving openings 178,178. Plate 160 is also provided with a second pair of tab-receiving elements 180,180 which are attached to the plate immediately adjacent its shorter opposed sides but which are wider than tab-receiving elements 176,176. The purpose in making tab-receiving elements 180,180 wider is that the openings which they define must be large enough to receive not only one of tabs 304 and 306 of brace 300 but, as best seen in FIG. 7(B), to also receive a tab 507 of brace 500.

Plate 168 is comparably provided with a pair of tab-receiving elements 184,184 which in cooperation with plate 168 define tab openings 186,186, as best seen in FIGS. 7(A) and 7(B). Note that tab-receiving elements 184,184 are inwardly offset with respect to the short opposed sides of plate 168 by a distance slightly greater than the width of tab-receiving elements 180,180 so that a brace 300 can be fitted as best understood with reference to FIG. 7(B).

Also, plates 160 and 164 may be provided with tool attachment elements such as 188 and 190 which may have any form suitable for detachably but securely attaching a selected tool. In the preferred embodiment illustrated in FIGS. 2 and 7(A), tool attachment element 188 may be merely a short thick plate welded or otherwise permanently attached for example to plate 164 and formed with pre-tapped holes 192,192 to which a conventional power router 194 may be attached by threaded bolts 196,196. See FIG. 7(A). Similarly, tool attachment element 190 may be formed to enable secure but detachable attachment thereat of a conventional power disc saw 198. Naturally, for a cutting bit 200 of power router 194 to be available to perform routing, a suitable aperture 202 must be formed to attachment element 188 and plate 164. Similarly, to enable a circular disc saw of power saw 198 to project upwardly of plate 164, a suitably shaped and sized opening 204, preferably of rectangular form must be provided in plate 160. The exact details of how and exactly where a selected tool is to be mounted, as well as where to dispose protective elements to be used therewith, can be decided by a particular user and the examples discussed herein are not intended to be limiting. Actually, power tools such as router 194 and disc saw 198 will have their respective power cords 206 and 208 with plugs 210 and 212, respectively, to be connected to an electrical power source to enable their operation.

In describing the elements illustrated in FIG. 2, the above discussion has inherently also explained how the plates are set up for the workbench mode of the invention, i.e., braces 300 and 500 are fitted on opposite sides to securely brace the plates 158 to 160 and 164 to 168, so that the central plates 160 and 164 cooperate to provide a secure flat, smooth, workbench surface at close to waist height for an average working man. Upon the provision of electrical power, a user of this invention can operate the selected power tools to perform machining operations on workpieces as desired.

Note that wall 150 at the long edge of plate 158 closest to the hinged edge of tailgate 102, as best seen in FIGS. 7(A), also defines a point for the placement of the lowest edge of plate 168 to facilitate engagement of the desired braces. Persons of ordinary skill in the mechanical arts can be expected to thus comfortably utilize the present invention in its workbench mode.

Referring back to FIGS. 6(A) and 6(B), it will be seen how a brace 400 is applied to engage with brace receiving element 176 of plate 160 in such a manner that the central portion of tab receiving element 176 is sandwiched between tabs 406 and 407. Base 400 actually is fitted to tailgate 102 by the insertion of tab 404 through elongate opening 149 in the wall length 146 along the side of the tailgate and is then inserted toward tab-receiving element 176 for the just-described engagement of tabs 406 and 407 with tab-receiving element 176.

The spacing between tabs 406 and 407 may be selected to be such that the tabs 406 and 407 sandwich between them both the elongate portion of tab-receiving element 176 and the thickness of plate 164. In this manner, as the truck is driven around, plates 160 and 164 will be held together securely to minimize rattling and incidental damage. Note that a long load 250, e.g., a log longer than just the load bed of the truck, can thus extend outside of the load bed proper on lowered tailgate 102 and yet be prevented from having its outside end slide out of the truck. Note that because brace element 400 is inserted through aperture 149, even if bouncing of the log causes it to impact upon brace 400, the brace will not slide out at its lower end. Naturally, if there are abnormal impact or inertia forces then the present simple, inexpensive, easy-to-use system may need to be augmented by more secure retention arrangements. However, for most users the present system should function efficiently when deployed in its load space enlargement mode per FIGS. 6(A) and 6(B). The above-described manner in which brace 400 fits at its lower end to tailgate 102 is clarified in FIG. 6(B).

Tailgate 102 may be hinged to the lower rear portion of the load bed of the truck 100 in any conventional manner, including provisions for ready detachment thereof. Likewise, the upper end of the two-part stay 106 may be formed to pivot about pivot 108 mounted to one of the truck walls and have a form for ready detachment from the truck. Such details of conventional structure can be readily accommodated with the present invention.

As is readily seen in FIG. 2, braces 300, 400 and 500 can be simply placed with their respective tabs depending into selected openings such as 128 and 130 to be detachably but securely held to the inside surface 118 of tailgate 102 in one of the normally found depressions therein. When the plates 158, 160, 164 and 168 are folded in their stored mode, as illustrated in FIG. 1, the pairs of braces 300, 400 and 500 are thus hidden from view but are securely held for immediate access as and when needed.

A user can leave the workbench set up with the tailgate in its upright position and deploy it for use simply by lowering the tailgate 102. In the upright position of the tailgate 102, with the plates braced to provide the workbench disposition, because the sides of the truck serve to close off the space defined by the plates and the tailgate there is effectively created a closed box (not shown). With a conventional, preferably key actuable and lockable, latch on the tailgate the user thus has a closed storage box.

As illustrated generally in FIGS. 2 and 7(A) a dimension determining element, e.g., a linear scale 600 extending across the length of a plate, may be provided at a readily visible and/or accessible location anywhere on the external surface of the assembled plates, as indicated in FIGS. 2 and 7(A), to facilitate a user's measurement of a workpiece dimension. To avoid rattling of the plates when the pick-up truck is being driven with the plates folded flat to the tailgate, a key 800 having a generally "L-shaped" cross-section may be inserted through each of apertures 148 and 149 in lengths 144 and 146 respectively of the stock material of the wall. The key 800 preferably has one arm 802 of a rectangular cross-section sized to closely fit into one of the apertures 148,149 and long enough to act as a firm spacer between adjacent plates such as 158,168, as best understood with reference to FIGS. 8(A) and 8(B). The other arm 804 of key 800 is then pushed to be close to, for example, the wall 144 as indicated by the arrows in FIGS. 8(A) and 8(B).

In this disclosure, there are shown and described only the preferred embodiments of the invention, but, as aforementioned, it is to be understood that the invention is capable of use in various other combinations and environments and is capable of changes or modifications within the scope of the inventive concept as expressed herein.

What is claimed is:

1. A system mountable to a tailgate of a pick-up truck to increase the utility thereof, comprising:
    a first plate having first and second longitudinal edges, pivotably mounted at said first edge to pivot along a distal edge of an inside face of the tailgate, the first plate having first brace-engagement means for engaging with a first brace to be braced thereby at a predetermined first angle with respect to the inside face of the tailgate;
    a second plate having third and fourth longitudinal edges, pivotably connected at said third edge to said second edge, said second plate having second and third brace-engagement means for respectively engaging with corresponding second and third braces to be braced thereby at a predetermined second angle with respect to the inside face of the tailgate;
    a third plate having fifth and sixth longitudinal edges, pivotably connected at said fifth edge to said fourth edge;
    a fourth plate having seventh and eighth longitudinal edges, pivotably connected at said seventh edge to said sixth edge, said fourth plate having fourth brace-engagement means for engaging with a fourth brace to be braced thereby at a predetermined third angle with respect to the tailgate; and
    a plurality of braces, comprising at least said first, second, third and fourth braces, for selectively and detachably engaging at least one of said first, second, third and fourth brace-engagement means to brace said connected first through fourth plates in a predetermined disposition with respect to each other and to the inside face of the tailgate.

2. The system according to claim 1, wherein:
    said plurality of braces comprises first, second and third pairs of detachable elongate braces each having a respective longitudinal body portion contiguous with at least one engagement tab at each end, said engagement tabs each being orthogonal to the corresponding body portion,
    wherein said engagement tabs are shaped and sized to closely fit to at least one of said first, second, third and fourth brace-engagement means to thereby securely brace the corresponding plate thereat.

3. The system according to claim 2, further comprising:
    means for storing said plurality of braces within recessed portions formed in the tailgate for storage of said plurality of braces when the system is placed in a storage mode, wherein the recessed portions are provided with apertures at separations corresponding to separations between said engagement tabs of at least one of said plurality of braces.

4. The system according to claim 3, wherein:
    said means for storing said plurality of braces comprises a two-part system of which a first part is permanently attached to one of the recessed portions of the inside face of the tailgate and a second part is permanently attached to the body portion of at least one of said braces, whereby a detachable attachment between the first and second parts is obtained by the application of a pressure therebetween to detachably store the corresponding brace at the tailgate.

5. The system according to claim 4, wherein: at least one of said brace elements is provided with an additional engagement tab disposed parallel to and at a predetermined separation from one of the engagement tabs thereof, wherein said predetermined separation is sufficient to accommodate both the thickness of said third plate and an engaged portion of said third brace engagement means.

6. The system according to claim 3, wherein:
    each of said first through fourth brace engagement means comprises an elongate U-cross-sectioned element attached to an inside face of a corresponding one of said first through fourth plates so as to define an opening of selected shape and size to closely receive therein one of the engagement tabs of one of said plurality of braces.

7. The system according to claim 6, wherein:
    said tailgate is formed to have tailgate engagement means for engaging with one of said plurality of braces to thereby brace one of said first through fourth plates directly to the tailgate.

8. The system according to claim 7, wherein:
    said tailgate is provided with a peripheral wall, and side portions of the peripheral wall are provided with tab-receiving tailgate engagement apertures,
    whereby one of the engagement tabs of said one of said plurality of braces can be passed through one of said tailgate engagement apertures to obtain engagement between the tailgate and said one brace.

9. The system according to claim 1, further comprising:
    tool attachment means provided at one of said first through fourth plates to enable mounting thereat of a selected tool to enable machining of a workpiece thereby.

10. The system according to claim 1, further comprising:
    means for determining a dimension, provided at an outside surface of one of said first through fourth plates.

11. A system mountable to a tailgate of a pick-up truck to enlarge a load-containment space of the truck, comprising:
    first, second, third and fourth flat rectangular plates pivotably connected in order from the first to the fourth plate by three parallel hinges, said first plate also being hinged at a distal edge of the tailgate by a fourth hinge parallel to said three hinges; and a plurality of braces for selectively engaging the tailgate and at least said second plate to securely brace all four pates orthogonal to the tailgate with the third and fourth plates being disposed to be parallel and next to the second and first plates respectively, to thereby define an enlarge load-containment space extending over the tailgate.

12. The system according to claim 11, wherein:

said plurality of detachable braces comprises a pair of symmetrically formed braces each having a body portion and engagement tabs contiguous with the body portion and orthogonal thereto at opposite ends of the body portion; and an additional tab parallel to and separated by a predetermined separation distance from one of said engagement tabs, said separation distance being selected to enable secure engagement to said second and third plates to brace the second and third plates directly to the tailgate.

13. The system according to claim 11, further comprising:

means for determining a dimension, provided at an outside surface of one of the rectangular plates.

14. The system according to claim 11, further comprising:

means for holding one of said first through fourth plates in a predetermined separation relative to another of said plates in a folded-away manner adjacent the tailgate.

15. A system mountable to a tailgate of a pick-up truck to provide a readily disposed workbench structure with the tailgate in an open, lowered, horizontal position, comprising:

first, second, third and fourth flat rectangular plates pivotably connected in order from the first to the fourth plate by three parallel hinges, said first plate also being hinged at a distal edge of the tailgate by a fourth hinge parallel to said three hinges; and a first pair of braces for engaging said first and second plates, at outside edge portions thereof, to brace them normal to each other with said first plate vertical with respect to said horizontally disposed tailgate, and a second pair of braces engageable with said second and fourth plates at outside edge portions thereof to brace them orthogonally with respect to each other, whereby the second and third plates are braced to provide at their respective outside surfaces a planar workbench surface.

16. The system according to claim 15, further comprising:

tool attachment means provided at said second and third plates to enable mounting thereat of selected tools so that a workpiece placed on said outside surfaces of said second and third plates can be machined thereby.

17. The system according to claim 15, further comprising:

means for determining a dimension, provided at an outside surface of one of the rectangular plates.

18. The system according to claim 15, further comprising:

means for holding one of said first through fourth plates in a predetermined separation relative to another of said plates in a folded-away manner adjacent the tailgate.

* * * * *